(12) United States Patent
Mann

(10) Patent No.: US 8,158,271 B2
(45) Date of Patent: *Apr. 17, 2012

(54) WAVEFORM PANEL

(75) Inventor: Ronald Leslie Mann, Sydney (AU)

(73) Assignee: Gram Engineering Pty Limited, Smithfield (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,313

(22) Filed: Sep. 12, 2011

(65) Prior Publication Data

US 2011/0314653 A1 Dec. 29, 2011

Related U.S. Application Data

(63) Continuation of application No. 12/389,067, filed on Feb. 19, 2009, now Pat. No. 8,029,913.

(30) Foreign Application Priority Data

Feb. 20, 2008 (AU) .............................. 2008900793
Feb. 9, 2009 (AU) .............................. 2009200462

(51) Int. Cl.
*E04B 1/00* (2006.01)
*E04B 7/00* (2006.01)
*E04B 2/00* (2006.01)

(52) U.S. Cl. ........ 428/595; 52/783.14; 428/59; 428/182; 428/603; 256/73; D25/138

(58) Field of Classification Search .................... 256/73; 52/220.4, 336, 450, 573.1, 783.11, 783.14, 52/783.16–783.19, 798.1, 671, 674, 840; D25/110, 120, 138, 143, 155
See application file for complete search history.

(56) References Cited

U.S. PATENT DOCUMENTS

| | | | |
|---|---|---|---|
| 1,351,694 A | 8/1920 | Scanlon | |
| 2,200,240 A | 5/1940 | Gilpin | |
| 3,095,184 A | 6/1963 | Boxberger | |
| 3,308,596 A | 3/1967 | Cooper et al. | |
| 3,351,441 A * | 11/1967 | Gewiss | 428/594 |
| 4,011,697 A | 3/1977 | Fedolfi | |
| 4,186,541 A | 2/1980 | Sivachenko | |
| 4,472,473 A * | 9/1984 | Davis et al. | 428/184 |
| 5,314,738 A * | 5/1994 | Ichikawa | 428/182 |
| 6,050,030 A | 4/2000 | Wax | |

FOREIGN PATENT DOCUMENTS

DE 29700208 U1 2/1997

* cited by examiner

*Primary Examiner* — Jennifer McNeil
*Assistant Examiner* — Adam Krupicka
(74) *Attorney, Agent, or Firm* — Pearne & Gordon LLP

(57) ABSTRACT

A panel is disclosed formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough.

13 Claims, 3 Drawing Sheets

WAVEFORM PANEL

FIELD OF THE INVENTION

The present invention relates to a panel, and particularly to a panel formed from sheet material suitable, although not exclusively, for use as a fence infill panel. The panel may also be used for other applications, such as wall cladding and roofing.

BACKGROUND OF THE INVENTION

Some fences are constructed using regularly spaced upright support posts to which are attached sturdy upper and lower support rails. An infill panel is fixed between the upper and lower support rails to provide privacy and/or to block the passage of people and animals. In many applications, the fence can be quite prominent and as such there is a continuing demand for fencing which is visually appealing and which is relatively inexpensive to manufacture.

SUMMARY OF THE INVENTION

In one aspect of the invention there is provided a panel formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough.

In at least some embodiments the concave and convex section of respective of the formations each have a radius which is at least 10 times greater than the radius of the peak or the trough. More usually, the radius of the concave or convex section is at least 20 times greater then the radius of the peak or the trough.

Typically, the radius of the curvature of the convex and concave section is substantially equal and generally, lies in a range of from 50 mm to 200 mm. More usually, the radius of the concave and convex sections is about 100 mm.

Typically also, the formations are spaced apart from each other along the panel at a regular pitch. The pitch of the formations is usually between 1 and 2 times greater than the radius of either the concave or convex section.

In at least some forms, the pitch of the formations is from about 2 to about 10 times greater than the depth between the peaks and the troughs. Most usually, the pitch of the formations is at least 3 times greater than the depth between the peaks and the troughs. The pitch of the formations generally lies in a range of from about 50 mm to about 300 mm and more usually, is about 150 mm.

The depth between the peaks and troughs may be constant along the panel.

Each peak may fall substantially mid way between each trough.

Each trough may have a flattened section.

In another aspect of the invention there is provided a fence comprising a panel. formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough.

In another aspect the invention there is provided a method of manufacturing a panel formed from sheet material and having opposite edges, the method comprising profiling the sheet material to include a plurality of formations spaced along the length of the panel and extending between the edges, each formation including a substantially convex section and a substantially concave section which meet at a peak, and wherein each formation meets an adjoining formation at a trough.

The sheet material may be provided with a protective coating.

The panel can formed using any suitable fabrication technique. In at least some embodiments, the panel is formed by roll forming.

Accordingly, in another aspect of the invention there is provided a roll forming apparatus for manufacturing a panel from sheet material and having opposite edges, the apparatus having a plurality of forming rolls for profiling the panel to include a plurality of formations spaced along the length of the panel and extending between the edges, each formation including a substantially convex section and a substantially concave section which meet at a peak, and wherein each formation meets an adjoining formation at a trough.

In at least some embodiments, the panels can be used in fencing or cladding applications and are aesthetically pleasing. When used as infill elements of fences, the panels provide a similar appearance either side of the fence. Moreover, panels as described herein may be produced at relatively low cost employing roll-forming operations, and may be stacked thus providing for efficient transportation and warehousing.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like that has been included in this specification is solely for the purpose of providing a context for the present invention. It is not to be taken as an admission that any or all of these matters form part of the prior art base or were common general knowledge in the field relevant to the present invention as it existed anywhere before the priority date of this application.

The features and advantages of the invention will become further apparent from the following detailed description of non-limiting embodiments.

In this specification the terms "concave" and "convex" encompass any shape which curves or bulges outwardly or inwardly. The shape need not have a constant rate of curvature such as by being of the same profile as part of a circle. Any inwardly or outwardly curving section is considered to fall within the scope of the terms "convex" and "concave" respectively. For example, a section of an ellipse is encompassed by the terms concave and convex.

BRIEF DESCRIPTION OF THE ACCOMPANYING DRAWINGS

DETAILED DESCRIPTION OF EMBODIMENTS OF THE INVENTION

Figure 1:
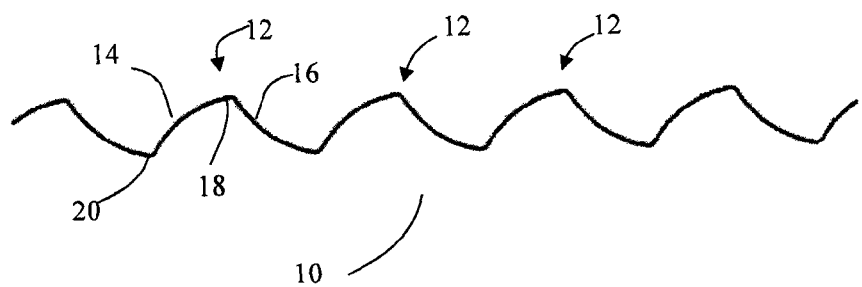
FIG. 1 is a cross sectional view of a panel according to an embodiment of the invention illustrating the profile of the panel.
Figure 2:
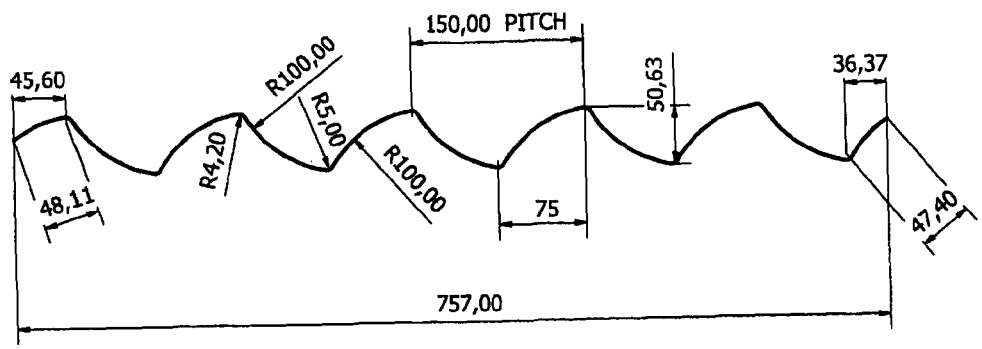
FIG. 2 shows the same view as FIG. 1 provided with dimensions.

Referring to FIGS. 1 to 4, a panel 10 embodied by the invention is shown in cross section. The panel is formed from sheet steel although a panel as described herein could be formed from polycarbonate or other suitable polymer or plastics material conventionally used for the manufacture of such panelling. Dimensions of the panel are omitted for clarity in FIG. 1 and are shown in FIG. 2 only to provide a clear understanding of the cross sectional profile of the panel. It is to be understood that the dimensions provided are in no way intended to be limiting on the scope of the invention.

The panel 10 has been passed through a roll former to form a plurality of repeating formations 12 which are evenly spaced along the length of the panel and extending between the opposite edges of the panel. Each formation includes a convex section 14 and a concave section 16 which meet at a peak 18. As can also be seen, each formation 12 meets an adjoining formation at a trough 20.

The panel is profiled such that that the radius of the concave and convex sections is greater than the radius of the peaks and the troughs. The radius of the convex and concave sections is essentially constant along the panel and typically in the range of from about 50 mm to about 200 mm. In the illustrated embodiment, the radius of the convex and concave sections is 100 mm. The radius of each peak and trough is respectively also essentially constant along the panel and can lie in the range of 1 to 10 mm and more usually, in a range of from about 3 mm to about 6 mm, In the embodiment shown the radius at each peak is 4.2 mm and the radius at each trough is 5 mm. Accordingly, the concave and convex sections of adjacent formations of the panel essentially meet at a point.

The formations 12 can repeat at a pitch in the range of about 50 mm to about 300 mm along the panel and more usually, in a range of from about 100 mm to about 200 mm. In the embodiment shown, the formations 12 repeat at a pitch of about 150 mm. The concave and convex sections each have an effective length along the panel of 75 mm. Thus, each trough is mid way between two adjacent peaks. In other embodiments, the concave sections may have a different effective length to the convex sections and so each trough will be to one side of the mid point between adjacent peaks.

The depth between the peaks and troughs can lie in the range of from about 20 mm to about 200 mm and more usually, in a range of from 25 mm to about 75 mm. In the embodiment shown, the depth between the peaks and the troughs is 50.63 mm.

Furthermore, as shown in the accompanying figures, the distance of the peaks and troughs from a notional centre plane in which the panel lies is essentially constant along the panel.

The panel can have a width in the range of from about 300 mm to about 2000 mm or more, and can be provided in a width to suit the particular application. In the embodiment shown, the panel 10 has a width of about 757 mm. The panel may be cut to any length. While particular ranges of dimensions have been specified above, all individual ranges and specific lengths within the specified ranges are expressly encompassed.

The panel may be provided in a version known as "mini-profile". In these embodiments, the formations are particularly small. For instance, the formations may repeat at a pitch of between 10 mm to 50 mm and the depth between the peaks and troughs may be between 5 mm to 20 mm.

The panel 10 can be formed from flat sheet material by way of a roll forming process using a roll forming apparatus. Roll forming apparatus are well known in the art and generally have a plurality of pairs of forming rolls, the desired profile of the panel being formed as the sheet material passes through the nip of the respective pairs of rolls. Any suitable such roll forming machine can be used and given the wide use of roll forming apparatus in the art, they do not need to be further described here.

The sheet material can have a thickness in the range of from about 0.5 mm to about 4 mm. The sheet may be formed from one of a variety of metals and metal alloys, and may be provided with a corrosion resistant coating such as a paint layer and/or an alloy of zinc and aluminium. In particular, the panel can be provided in any desired colours or surface finish such as a gloss, semi-gloss, metallic, or burnished finish. Further, the colour of one side of the panel may be a different colour to the other side of the panel. Indeed, the convex sections may be provided in a different colour to the concave sections along one side of the panel. The appearance of the panel will therefore change depending upon the viewing angle of the onlooker.

Figure 3:
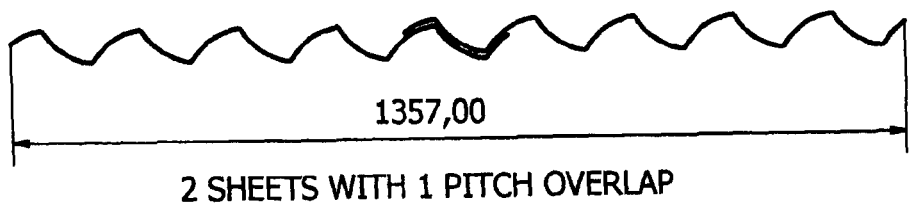
FIG. 3 shows the overlapping of two panels of FIG. 1.
Figure 4:
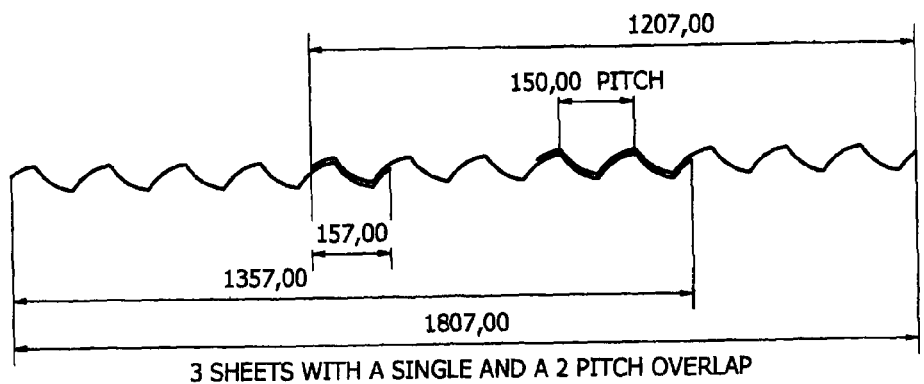
FIG. 4 illustrates the overlapping of three panels of FIG. 1.

A number of panels embodied by the invention can be overlapped at their longitudinal end margins to provide various effective lengths of panels. Referring to FIG. 3, two panels 10 are joined with a one pitch overlap, thus providing an effective overall length of 1357 mm. In FIG. 4, three panels are shown joined with a two pitch overlap to provide an effective length of 1807 mm.

Figure 5:
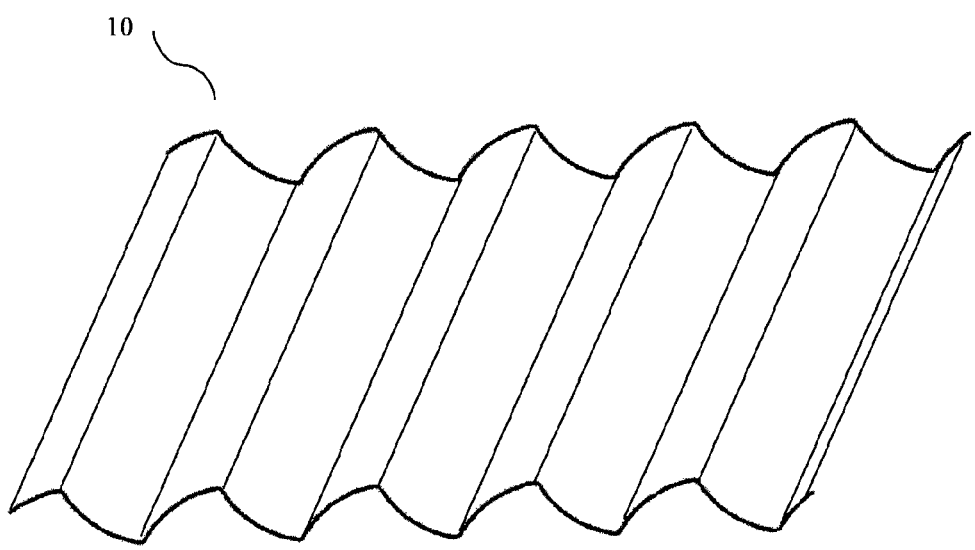
FIG. 5 is a perspective view of the panel of FIG. 1.

Referring to FIG. 5, the panel 10 is shown in perspective view.

Figure 6:
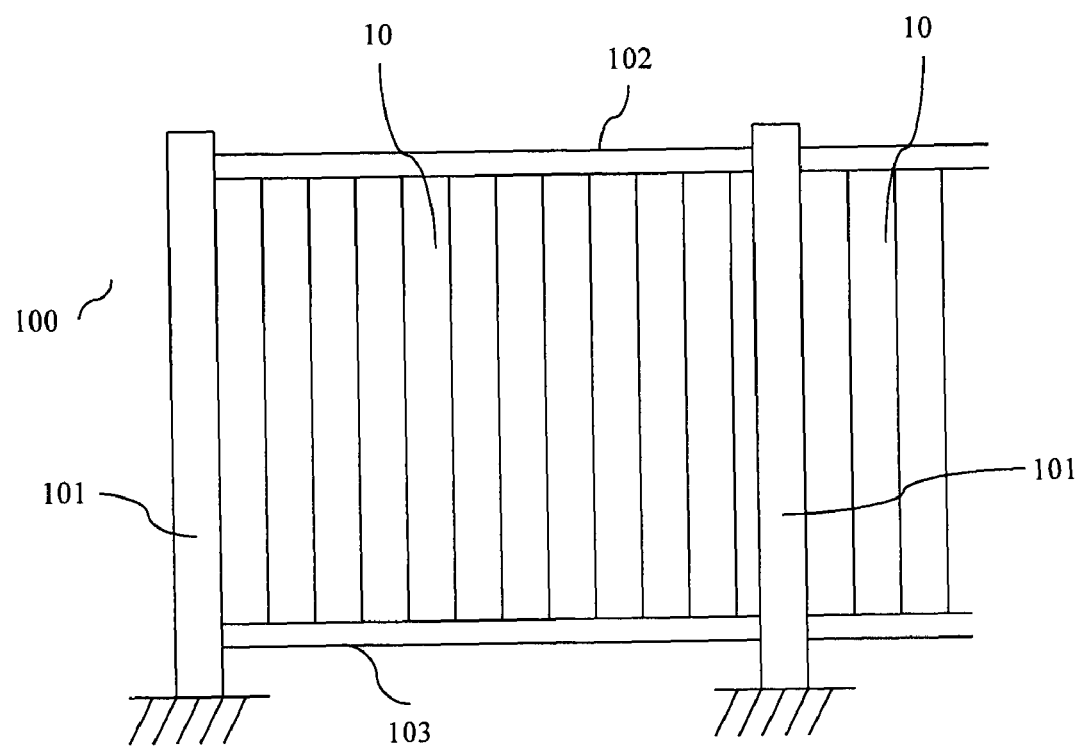
FIG. 6 is a schematic view of a fence incorporating a plurality of the panels of FIG. 1.

The panel 10 is ideally suited for use in fencing. Referring now to FIG. 6, a fence 100 is shown which uses a plurality of panels 10 as infills of the fence. In particular, in the embodiment shown, fence 100 includes spaced apart fence posts 101 which are interconnected by rigid top and bottom rails 102, 103. The panels are disposed between the rails 102 and 103 to form the infill elements of the fence 100. Post and rail arrangements of this general type are well known in the art.

The embodiments of panel have been described in the context of use as a fence infill panel. However, it will be understood that embodiments of the panel of the invention are also suitable for other uses including for use in roofing or cladding applications.

In other embodiments the formations meet at each trough and one or more of the troughs has a flatted section between formations. Screws or other fasteners can be inserted through the flattened section. The flattened section is useful if the panel is to be used for roofing applications.

Whilst the particular embodiment described was profiled by roll forming, other fabrication techniques may be employed. For example, in the case of a panel formed from polycarbonate, the panel may be formed by extrusion.

In still further embodiments, the pitch of the formations is irregular and may increase or decrease across the length of the panel.

Although the invention has been described with reference to particular embodiments, it will be appreciated by those skilled in the art that numerous variations and/or modifications can be made without departing from the invention as broadly described. The present embodiments are, therefore, to be considered in all respects as illustrative and not restrictive.

The invention claimed is:

1. A panel formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough and wherein the panel is of sufficient stiffness that the length of the panel remains substantially constant during handling and installation wherein the radius of the curvature of the concave or convex sections of respective of the formations is at least 10 times greater than a radius of the peak or the trough.

2. A panel according to claim 1 wherein the radius of the concave or convex sections is at least 20 times greater then the radius of the peak or the trough.

3. A panel according to claim 1 wherein the radius of the convex sections and the radius of the concave sections are substantially equal.

4. A panel according to claim 1 wherein the radius of the concave or convex sections lies in the range of from 50 mm to 200 mm.

5. A panel according to claim 4 wherein the radius of the concave or convex sections is about 100 mm.

6. A panel according to claim 1 wherein the formations are spaced apart from each other along the panel at a substantially regular pitch.

7. A panel according to claim 6 wherein the pitch of the formations is between 1 and 2 times greater than the radius of either the concave or convex sections.

8. A panel according to claim 6 wherein the pitch of the formations is about 3 times greater than the depth between the peaks and the troughs.

9. A panel according to claim 6 wherein the depth between the peaks and troughs is essentially constant along the panel.

10. A panel according to claim 6 wherein each peak falls substantially mid way between each trough.

11. A panel formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough and wherein the panel is of sufficient stiffness that the length of the panel remains substantially constant during handling and installation wherein the pitch of the formations is between 2 to 10 times greater than the depth between the peaks and the troughs.

12. A panel formed of sheet material, the panel having opposite edges and being profiled to include a plurality of formations spaced along the length of the panel and extending between the edges, each formation including a substantially convex section and a substantially concave section which meet at a peak, and wherein each formation meets an adjoining formation at a trough and wherein the panel is of sufficient stiffness that the length of the panel remains substantially constant during handling and installation wherein the pitch of the formations lies in the range of from 50 mm to 300 mm.

13. A panel according to claim 12 wherein the pitch of the formations is about 150 mm.

\* \* \* \* \*